June 16, 1925.
H. H. LOGAN
SAFETY BRAKE ENGINE
Filed July 24, 1924
1,541,833
3 Sheets-Sheet 1
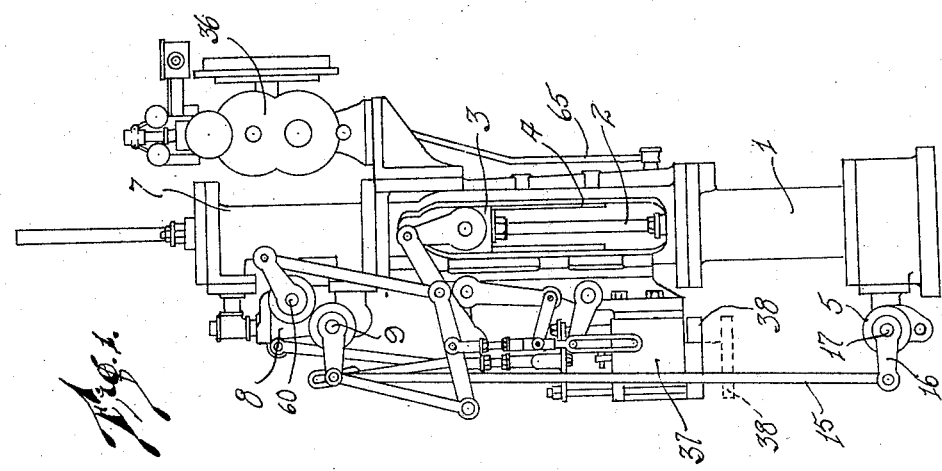
INVENTOR
H. H. Logan
BY
ATTORNEYS

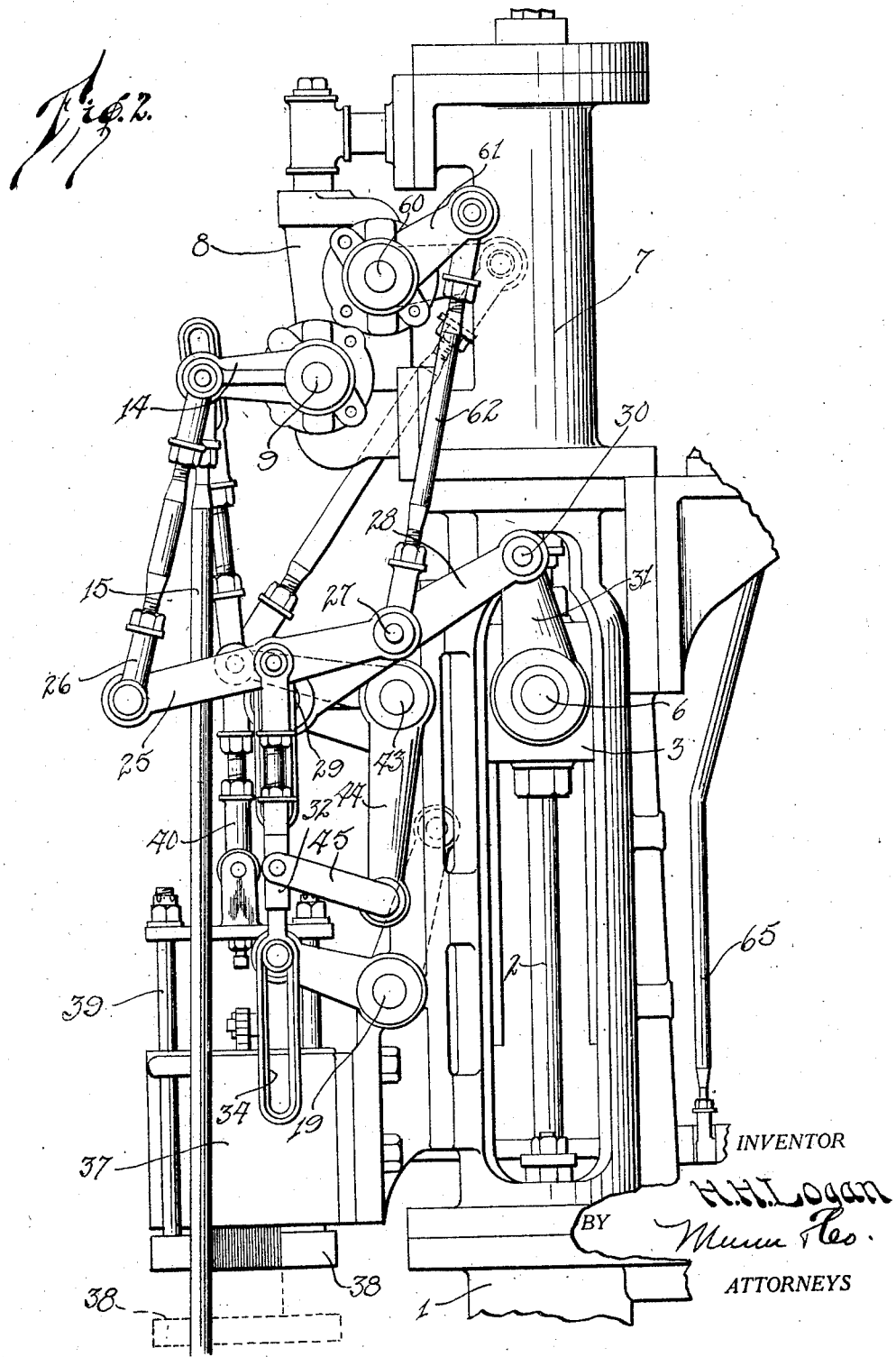

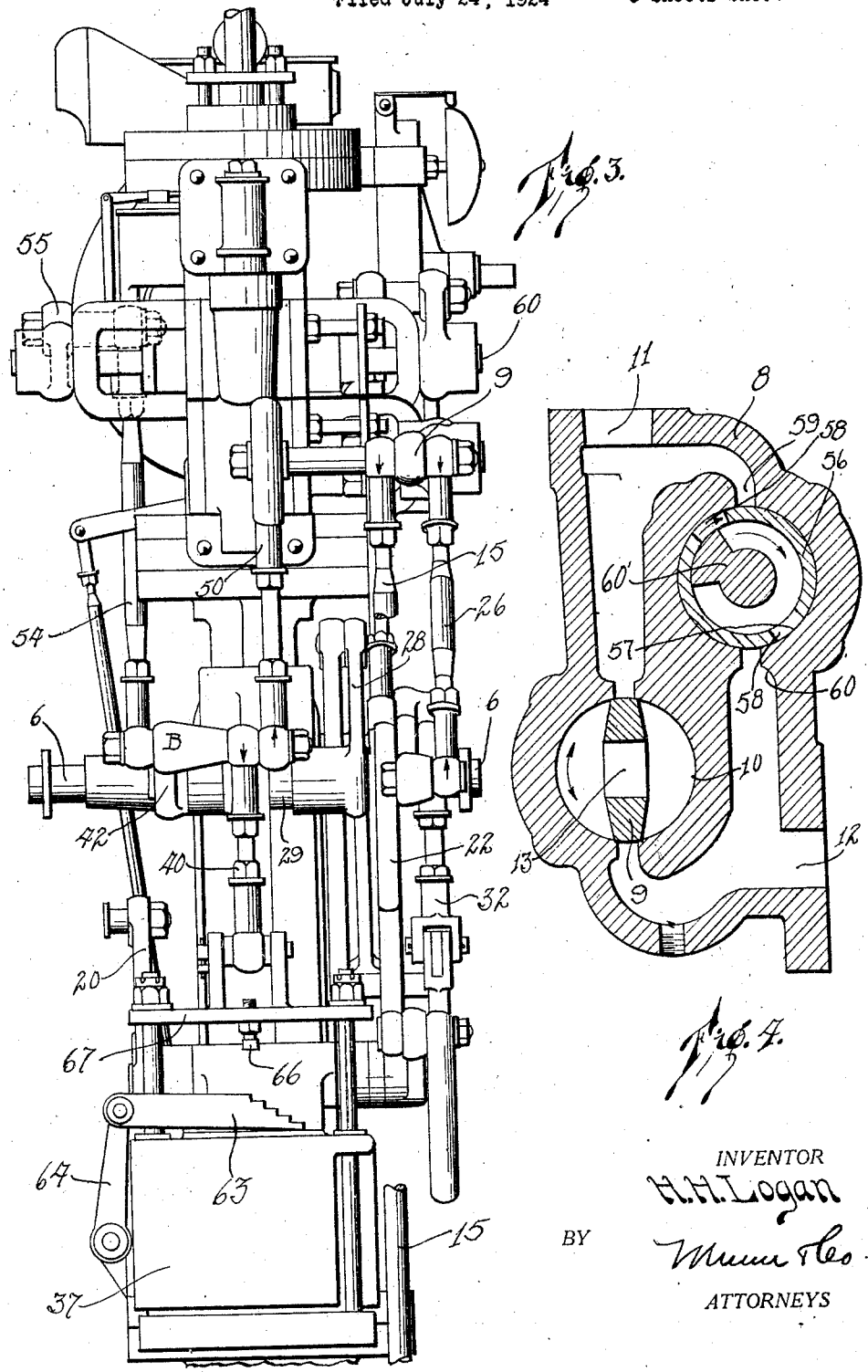

Patented June 16, 1925.

1,541,833

UNITED STATES PATENT OFFICE.

HENRY H. LOGAN, OF CHICAGO, ILLINOIS.

SAFETY BRAKE ENGINE.

Application filed July 24, 1924. Serial No. 728,013.

*To all whom it may concern:*

Be it known that I, HENRY HAVELOCK LOGAN, a citizen of Great Britain (who have declared my intention of becoming a citizen of the United States), and a resident of Chicago, county of Cook, and State of Illinois, have invented a new and useful Improvement in Safety Brake Engines, of which the following is a full, clear, and exact description.

My invention relates to improvements in safety brake engines of the air or steam operated type, and it consists in the combinations, constructions, and arrangements herein described and claimed.

In this type of brake engine, the air or steam is admitted by a valve into the bottom of a cylinder to raise a piston therein which in turn raises weighted levers. These weighted levers are connected with the brake shoes of a hoist drum so that when the levers are permitted to fall by virtue of their weight, the brake shoes or bands as the case may be are applied to the drum to stop the rotation and movement thereof. If air and steam alone were employed for operating such a brake engine, the action would be too erratic owing to the compressible qualities of the motive power used in raising the weighted levers. To overcome this irregular operation another cylinder known as the oil cylinder is placed in tandem with the operating air or steam cylinder, and this second cylinder is filled with oil and has a piston to fit the bore thereof and a rod connecting with that in the operating cylinder, so that the movement of the operating piston produces a corresponding movement in the oil cylinder piston.

A passage or by-pass connects one end of the bore in the oil cylinder with that in the other end and a valve is disposed in this passage for controlling the rate at which the oil may pass from below the piston to above the piston. This valve is connected with the operating valve of the air or steam operating cylinder so that when the operating valve is moved to admit pressure to the under side of the operating piston, the oil valve will be moved a corresponding amount, allowing the oil to flow from the upper side of the oil piston to the lower side as the pressure tends to move the operating piston upwardly. The reverse of this action is true when the operating valve is opened to permit air or steam to exhaust from the cylinder. It follows, then, that the amount the valves are moved determines the rate of speed at which the pistons move and jerking or erratic movement is avoided because of the oil being limited in its passage to correspond with the desired rate of speed.

My present brake engine is an improvement over the type herein described and embodies additional mechanism and devices whereby the engineer can normally operate the valve controlling the operation of the brake engine to raise or lower the weighted levers with positive means for operating either to release or set the brake except when a safety device associated with the brake engine operates. When this safety device operates the means for releasing the brake is rendered ineffective and the engineer can then only assist in quickening the setting of the brake and cannot in any way prevent this operation.

A further object of my invention is to provide a brake engine of the type described in which means for regulating the rate of speed at which the brake sets is provided and which depends upon predetermined conditions such as the position of the skip or cage operated by the hoist drum in its shaft.

A further object of my invention is to provide a brake engine of the type described in which the connections between the engineer's control and the valves of the brake engine are never actually disconnected but merely collapse as to one of the members, thus permitting the engineer's operation of the valves in one direction but precluding the engineer's operation of the valves in the opposite direction, when the safety device has functioned.

A further object of my invention is to provide a brake engine of the type described in which means is provided wherein if the current operating the hoist motor fails, the brake will automatically operate during the first portion of its travel to take up slack in the connections and in the brakes and bring the brake shoes in contact with the hoist drum as quickly as possible to prevent a further increase of speed. After the brake sets a part of its full travel it is automatically slowed down to the proper speed for the remainder of its movement. This quick action of the brake is effective at all times during the setting of the brake for the first part of its travel and is subject to regulated speed during the latter part of its travel. The portion of travel effected at quick speed will be about one-third of the entire movement, tapering to final acting speed during the next third of travel.

A further object of my invention is to provide a brake engine of the type described in which means is provided for eliminating movement of the engineer's lever when the automatic safety device employed for actuating the valves of the brake engine functions. In certain types of brake engines this movement of the engineer's lever occurs and often causes serious injury to the engineer.

A further object of my invention is to provide a brake engine of the type described in which means is provided for causing movement of the brake actuating mechanism to neutralize the effect of the movement of the engineer's lever in setting or releasing the brake. Hence the engineer's lever must be moved further in order to keep the brake shoes moving toward or away from the drum. This mechanism also gradually closes the oil valves as the piston nears the end of its travel, thereby preventing the approach to the end of travel except at a slow rate of speed.

A further object of my invention is to provide a brake engine of the type described which is practically automatic in operation, which is extremely responsive to slight movement of the engineer's lever, and which is thoroughly practical for the purpose intended.

Other objects and advantages will appear in the following specification, and the novel features of the invention will be particularly pointed out in the appended claims.

My invention is illustrated in the accompanying drawings, forming part of this application, in which—

Figure 1 is a side elevation of an embodiment of my invention,

Figure 2 is an enlarged view of a portion of the mechanism shown in Figure 1,

Figure 3 is a side elevation of the mechanism illustrated in Figure 2,

Figure 4 is an enlarged sectional view of the oil cylinder valves, and

Figure 5 is an enlarged perspective view of a portion of the mechanism illustrated in Figure 1.

In carrying out my invention I make use of an upright steam operating cylinder 1 having a piston therein connected with an upright rod 2 having a crosshead 3 intermediate its length, and guided in a slideway 4. A valve 5 is provided for the cylinder 1 for admitting and exhausting steam or air from the cylinder, thereby causing elevation or descent of the crosshead 3 by actuation of the valve.

The crosshead 3 is provided with laterally extending stub shafts 6 to which pivotally mounted weighted levers of the type common in use for actuating brake shoes are pivotally connected. Thus elevation or descent of the crosshead 3 would cause elevation and descent of the weighted levers to release and apply the brake shoes respectively.

An oil cylinder 7 is mounted in axial registration with the cylinder 1 and is provided with a piston therein secured at the upper end of the rod 2 and above the crosshead 3. Valves for controlling the passage of oil from above to below the piston and vice versa are disposed in a valve casing 8 secured to the side of the cylinder 7. This valve casing with its valve members is clearly shown in section in Figure 4.

The main valve or manually actuated valve which is intended for manual actuation by the engineer is disposed at the lowermost end of the casing 8 and consists in a yoke-shaped valve member 9 rotatably mounted within a valve chamber 10 and arranged to permit passage of oil from the port 11 to the port 12 of the casing 8 when the yoke is moved to any other position than that shown in Figure 4, the course of the oil through the valve member 9 being through the central opening 13 of the member.

This valve member 9, (see Figure 2) has an arm 14 extending radially therefrom exteriorly of the casing which is connected by means of a connecting rod 15 to an arm 16 carried by the valve member 17 of the operating valve 5. Thus, actuation of the valve 5 will cause proportional actuation of the manually controlled oil valve 9.

Means for permitting the engineer's operation of the valve members 9 and 17 consists in a shaft 19 rotatably mounted in a horizontal position parallel with the axis of the valve members 9 and 17. The shaft 19 has an arm 20 extending radially therefrom which is connected by means of a substantially rigid connecting rod with the engineer's lever ordinarily disposed upon the engineer's platform adjacent to the hoist drum. Actuation of the engineer's lever will cause rotation or oscillation of the shaft 19. A second radially extending arm 21 is carried by the shaft 19, (see Figure 5), to which a substantially vertical connecting member 22 is pivotally connected. The connecting member 22 is provided with a slotted portion 23 at the upper end thereof through which a pin 24 carried intermediate the length of the floating lever 25 is disposed. This floating lever 25 is connected at one end by means of the adjustable connecting rod 26 to the arm 14 of the valve member 9 and hence by means of the connecting rod 15 to the valve member 17, so that downward movement of the connecting member 22 may occasion actuation of the valve members 9 and 17. Upward movement of the connecting member 22, however, in itself will not in any way affect the floating lever 25 because of the slot 23.

The opposite end of the floating lever 25 is pivotally supported at 27 intermediate the length of a lever 28 which is rotatably mounted at 29 to the upright casting securing the cylinders 1 and 7 in correct relation.

The opposite end of the lever 28 is pivotally connected at 30 to an arm 31 pivotally supported upon the crosshead 3.

This construction causes a constant changing of the fulcrum of the floating lever 25 as the crosshead 3 rises or descends. Hence, the floating lever through which the engineer's operation of the valves is accomplished moves with the setting and releasing of the brakes. This functioning of the floating lever will be described more fully hereinafter. Means for permitting the engineer to move the floating lever 25 upwardly upon its floating fulcrum 27 is provided in a connecting member 32 pivotally supported at its upper end to the pin 24 and consisting of two hinged parts connected by means of the pin 33. These two parts are ordinarily in vertical alignment with one another and hence thrust at the upper end of the member 32 will occasion endwise movement of the entire member. If, however, the hinged parts are moved out of alignment with one another, thrust at the upper or lower end of the member will only result in further movement of the hinged parts out of alignment or slippage in the slot 34, and no movement of the floating lever 25 will result. The lower end of the member 32 is provided with a slot 34 through which a pin 35 carried by the arm 21 is projected.

Means for breaking or moving the normally aligned parts of the connecting member 32 out of alignment with one another by the actuation of a safety control device, such as that device shown generally at 36 in Figure 1 is provided in a solenoid 37 which is normally energized at all times during the operation of the brake engine, thus holding the solenoid plunger 38 in the position shown in full lines of the drawings, particularly Figure 2. In certain conditions, as in overspeeding of the hoist drum to which the controller 36 is sensitive, a switch will open and cause the deenergization of the solenoid 37, whereupon the plunger 38 will drop to the position shown in dotted lines in Figure 2. The plunger 38 is connected by means of upright rods 39 to a connecting link 40, the upper end of which is pivotally connected at 41, (see Figure 5) to an arm 42, extending radially from a rotatably mounted shaft 43. This shaft 43 is mounted upon the casting with which the cylinders 1 and 7 are connected.

A radially extending arm 44 is carried by the opposite end of the shaft 43 and a link 45 is pivotally connected at the outermost end of the arm 44', with the pin 33 forming the connecting member of the aligned parts of the connecting member 32, (see Figure 5). Thus movement downwardly of the plunger 38 will occasion movement of the arm 44 in a counterclockwise direction, (see Figure 5), and consequently will break the alignment of the aligned parts of the member 32, thereby preventing the engineer from raising the floating lever 25 upon its floating fulcrum 37 by actuation of the engineer's lever.

The arm 42 has pivotally supported thereon a connecting member 50 which is substantially on the axis of the pivotal connection 41. The upper end of this connecting member 50 is provided with a slot 51 through which a pin 52 carried by the arm 14 of the valve 9 is projected.

The arm 42 is also pivotally connected by means of an adjustable connecting rod 54 to an arm 55 carried by a sleeve valve member 56 rotatably disposed within a valve chamber 57 above the valve chamber 10 in the casing 8. This sleeve valve member is provided with a pair of aligned openings 58 therethrough through which, when the sleeve is turned into registration with the ports 59 and 60 communicating with the ports 11 and 12 of the casing respectively, oil may pass from one side of the oil piston to the other. I shall hereinafter refer to the valve 56 as a quick-action valve, and to the valve 9 as the engineer's oil control valve.

The purpose of having the quick-action valve is to permit the quick setting of the brakes in such an emergency as would cause the deenergization of the solenoid 37.

Means for suppressing quick movement of the operating piston and hence the rod 2, and the crosshead 3, when adjacent to its end of travel as in setting the brake is provided in a cut-off valve member 60' which is disposed within the sleeve quick-action valve 56. This valve member 60' has an arm 61 extending radially therefrom exteriorly of the casing 8 and is connected by means of an adjustable connecting rod 62 to the pivotal and floating fulcrum 27 of the floating lever 25, and hence to the connecting lever 28. It is thus apparent that whatever the crosshead 3 moves, the cut-off valve 60' will move also and when the crosshead is nearly at the bottom of its travel as in setting the brake, the cut-off valve will be in such a position as to prevent quick movement of the crosshead.

Means for limiting the fall of the solenoid 38 is provided in a stepped stop member 63 which is connected by means of a pivotally mounted lever 64 to a connecting rod 65 actuated by the controller 36. The movement of the stepped stop member 63 beneath a stop engaging member 66 carried by the solenoid yoke 67 is dependent upon the position of the skip or cage in the mine shaft. The type of controller indicated at 36 is well known in the art and I deem it unnecessary at the present time to more than merely refer to the controller as a standard type of hoist engine controller.

From the foregoing description of the various parts of the device, the operation thereof may be readily understood. Let us assume that my improved brake engine is properly installed on a hoist engine and that the engineer desires to gradually set the brakes at one of the landings as in the course of the usual operation of the device. To this end the engineer will move his lever in one direction, causing rotation of the shaft 19 in a counterclockwise direction, (see Figure 5). This will draw the connecting member 22 downwardly and cause the floating lever 25 to move downwardly. As the floating lever is drawn downwardly upon its fulcrum 27 the engineer's valve 9 will be opened slightly to permit oil to pass from the port 12 to the port 11, i. e., from below the piston to above the piston. This same movement of the valve arm 14 with which the valve 9 is associated will also open the exhaust port of the operating valve 5 having a valve member 17. The crosshead 3 will slowly descend, permitting the weighted levers operating the brake shoes to descend and actuate the brakes. If the engineer should stop movement of his lever during the setting of the brake and at a point intermediate the quadrant of the engineer's lever, the crosshead 3 will continue to move until the floating lever 25 has been moved by virtue of the connecting member 28 to such a position as to cause the valve member 9 to close, since at this time the floating lever 25 will move on the pin 24 as a center, (see Figure 5). It is necessary, therefore to continue movement of the engineer's lever to cause the complete setting of the brakes.

In releasing the brake the engineer will move his lever in the opposite direction, thus opening the valve 5 and the valve 9 so that the crosshead 3 may rise and will elevate the weighted levers. The engineer must continue movement of his lever on the quadrant, otherwise the crosshead will come to a standstill because of the actuation of the floating lever 25 associated with the oil valve.

If now the solenoid 37, should become de-energized, as by overspeeding of the hoist drum or the skip or cage reaching the limit of its travel, the shaft 43 will be actuated so as to break the aligned members of the connecting member 32. This will prevent the engineer from actuating the valves to release the brake. The brakes will be set because of the movement of the connecting member 50 associated with the shaft 43 by virtue of the arm 42, which will actuate the quick-action valve 56 as well as the valve member 9.

Movement of the crosshead will be suppressed as it reaches the downward limit of its travel as the cut-out valve slowly rotates in a clockwise direction, (see Figure 4) by virtue of the connection between the lever 28 and the connecting rod 62 with the valve member 60.

I claim:

1. A brake engine of the type described having a power cylinder, a piston in said power cylinder, an oil cylinder, a piston for said oil cylinder connected with the piston in said power cylinder, a valve for said power cylinder, a valve for said oil cylinder to permit the flow of oil from one side of said oil piston to the other side, means for manually actuating said valves, and other means associated with said pistons and said oil cylinder for permitting the quick movement of said pistons during the first part of their travel when said valves are open.

2. A brake engine of the type described comprising a power cylinder having a piston, an oil cylinder having a piston associated with the piston in said power cylinder, means for attaching a weighted brake lever to said pistons, a valve for said power cylinder for operating the piston therein, a manually actuated valve for said oil cylinder for permitting the movement of oil from one side of the oil piston to the other, a quick action valve for said oil cylinder for permitting the movement of oil from one side of said oil piston to the other, and electrically operated means actuated by predetermined conditions in the hoisting engine and hoist for which said brake engine is employed associated with said quick acting valve for opening said quick acting valve upon actuation thereof.

3. A brake engine of the type described comprising a power cylinder having a piston, an oil cylinder having a piston associated with the piston in said power cylinder, means for attaching a weighted brake lever to said pistons, a valve for said power cylinder for operating the piston therein, a manually actuated valve for said oil cylinder for permitting the movement of oil from one side of the oil piston to the other, a quick action valve for said oil cylinder for permitting the movement of oil from one side of said oil piston to the other, electrically operated means actuated by predetermined conditions in the hoisting engine and hoist for which said brake engine is employed associated with said quick acting valve for opening said quick acting valve upon actuation thereof, and means for manual actuation in both directions of said manually actuated valve.

4. A brake engine of the type described comprising a power cylinder having a piston, an oil cylinder having a piston associated with the piston in said power cylinder, means for attaching a weighted brake lever to said pistons, a valve for said power cylinder for operating the piston therein, a manually actuated valve for said oil cylinder for permitting the movement of oil from one side of the oil piston to the other, a quick action valve for said oil cylinder for permitting the movement of oil from one side of said oil piston to the other, electrically operated means actuated by predetermined conditions in the hoisting engine and hoist for which said brake engine is employed associated with said quick acting valve for opening said quick acting valve upon actuation thereof, means for manual actuation in both directions of said manually actuated valve, and other means associated with said manually actuated means and with said electrically operated means for preventing the manual operation of said manually actuated valve in one direction.

5. A brake engine of the type described comprising a power cylinder having a piston, an oil cylinder having a piston associated with the piston in said power cylinder, means for attaching a weighted brake lever to said pistons, a valve for said power cylinder for operating the piston therein, a manually actuated valve for said oil cylinder for permitting the movement of oil from one side of the oil piston to the other, a quick action valve for said oil cylinder for permitting the movement of oil from one side of said oil piston to the other, electrically operated means actuated by predetermined conditions in the hoisting engine and hoist for which said brake engine is employed associated with said quick acting valve for opening said quick acting valve upon actuation thereof, and means for positive manual actuation in both directions of said manually actuated valve.

6. A brake engine of the type described comprising a power cylinder having a piston, an oil cylinder having a piston associated with the piston in said power cylinder, means for attaching a weighted brake lever to said pistons, a valve for said power cylinder for operating the piston therein, a manually actuated valve for said oil cylinder for permitting the movement of oil from one side of the oil piston to the other, a quick action valve for said oil cylinder for permitting the movement of oil from one side of said oil piston to the other, electrically operated means actuated by predetermined conditions in the hoisting engine and hoist for which said brake engine is employed associated with said quick acting valve for opening said quick acting valve upon actuation thereof, means for manual actuation in both directions of said manually actuated valve, and other means associated with said manually actuated means and with said electrically operated means for preventing the manual operation of said manually actuated valve in one direction, and a cut-off valve associated with said oil cylinder for stopping the flow of oil from one side of said oil piston to the other arranged for actuation to gradually stop the flow of oil when said pistons approach the lowermost limit of travel.

7. A brake engine of the type described comprising an operating cylinder, a piston for said operating cylinder, an oil cylinder, a piston for said oil cylinder, said operating piston and said oil piston being connected together and arranged jointly for engagement with the weighted levers of a mine hoist brake, a valve for controlling said operating cylinder, a manually actuated valve for permitting passage of oil from one side of said oil piston to the opposite side associated with said oil cylinder, and means associated with said operating piston and said oil piston and with said oil cylinder for causing movement of oil from one side of said oil piston to the opposite side faster during the initial downward movement of said oil piston than during the latter portion of its travel.

8. In a brake engine of the type described, a cylinder having fluid therein, a piston in said cylinder, a valve for said cylinder to control the transfer of said fluid from beneath the piston, manually operated means for actuating said valve, and other means automatically actuated, associated with said cylinder, for permitting the transfer of said fluid from beneath said piston at a relatively rapid rate during the first part of the downward movement of said piston.

9. In a brake engine of the type described, a cylinder having fluid therein, a piston in said cylinder, a valve for said cylinder to control the transfer of said fluid from beneath the piston, manually operated means for actuating said valve, and other means including an auxiliary valve automatically actuated, associated with said cylinder, for permitting the transfer of said fluid from beneath said piston at a relatively rapid rate during the first part of the downward movement of said piston.

10. A brake engine of the type described comprising an operating cylinder, a piston in said operating cylinder, a valve for said cylinder to control the admission and discharge of operating fluid, means for manually actuating said valve to operate said brake engine as in applying the brakes and to operate said engine as in releasing the brakes, automatically operated means including a collapsible member, actuated under predetermined conditions in the hoist for which said brake engine is employed for actuating said valve to apply the brakes operated by said brake engine and for rendering said first named means incapable of manual operation to release the brakes.

HENRY H. LOGAN.